United States Patent
Choi et al.

(10) Patent No.: US 12,251,856 B2
(45) Date of Patent: Mar. 18, 2025

(54) COMPLEX MINUTE CUTTING APPARATUS FOR SUPER ABSORBENT POLYMER HYDROGEL

(71) Applicant: LG CHEM, LTD., Seoul (KR)

(72) Inventors: Jinuk Choi, Daejeon (KR); Heechang Woo, Daejeon (KR); Gicheul Kim, Daejeon (KR); Yoon Jae Min, Daejeon (KR)

(73) Assignee: LG CHEM, LTD., Seoul (KR)

( * ) Notice: Subject to any disclaimer, the term of this patent is extended or adjusted under 35 U.S.C. 154(b) by 202 days.

(21) Appl. No.: 17/630,576

(22) PCT Filed: Nov. 19, 2020

(86) PCT No.: PCT/KR2020/016390
§ 371 (c)(1),
(2) Date: Jan. 27, 2022

(87) PCT Pub. No.: WO2021/101277
PCT Pub. Date: May 27, 2021

(65) Prior Publication Data
US 2022/0258380 A1   Aug. 18, 2022

(30) Foreign Application Priority Data
Nov. 21, 2019 (KR) ........................ 10-2019-0150705

(51) Int. Cl.
*B29B 9/12* (2006.01)
*B26D 5/22* (2006.01)
(Continued)

(52) U.S. Cl.
CPC ................. *B29B 9/12* (2013.01); *B26D 5/22* (2013.01); *B26D 7/0666* (2013.01); *B29B 13/10* (2013.01)

(58) Field of Classification Search
CPC .... B29B 9/00; B29B 9/10; B29B 9/12; B29B 13/00; B29B 13/10; B29B 7/422;
(Continued)

(56) References Cited

U.S. PATENT DOCUMENTS

| 4,446,261 A | 5/1984 | Yamasaki et al. |
| 4,844,372 A | 7/1989 | Weiler et al. |

(Continued)

FOREIGN PATENT DOCUMENTS

| CN | 102824878 A | 12/2012 |
| CN | 106715543 A | 5/2017 |

(Continued)

OTHER PUBLICATIONS

Office Action dated Jul. 21, 2023 issued in corresponding Chinese Patent Application No. 202080050463.2.
(Continued)

*Primary Examiner* — Christopher W Raimund
(74) *Attorney, Agent, or Firm* — Morgan, Lewis & Bockius LLP (57) ABSTRACT

A complex minute cutting apparatus for a superabsorbent hydrogel is disclosed. The complex minute cutting apparatus includes: a barrel body in which a transfer space through which a hydrogel is transferred is formed and a discharge part is formed at a side surface thereof; a transfer unit installed in the barrel body to transfer the hydrogel in the transfer space; and a plurality of cutting modules installed in the transfer unit to pulverize the hydrogel and discharging it to an outside of the discharge unit in a cut state.

7 Claims, 9 Drawing Sheets (51) Int. Cl.
*B26D 7/06* (2006.01)
*B29B 13/10* (2006.01)

(58) Field of Classification Search
CPC .. B29B 7/428; B29B 9/06; B26D 5/00; B26D 5/20; B26D 5/22; B26D 7/00; B26D 7/06; B26D 7/066; B26D 7/0666; B26D 3/00; C08J 2333/02; C08J 3/12; Y02W 30/62; B02C 18/36
See application file for complete search history.

(56) References Cited

U.S. PATENT DOCUMENTS

| | | | |
|---|---|---|---|
| 5,704,555 | A | 1/1998 | Arastoopour |
| 2008/0080300 | A1 | 4/2008 | Stueven et al. |
| 2009/0305884 | A1 | 12/2009 | Sakamoto et al. |
| 2014/0066584 | A1 | 3/2014 | Peterson et al. |
| 2015/0283732 | A1 | 10/2015 | Ito et al. |
| 2016/0199529 | A1 | 7/2016 | Torii et al. |
| 2016/0207226 | A1 | 7/2016 | Torii et al. |
| 2017/0216817 | A1* | 8/2017 | Torii ............... A61L 15/60 |
| 2019/0001302 | A1 | 1/2019 | Shuto et al. |
| 2019/0275192 | A1 | 9/2019 | Torii et al. |
| 2019/0308358 | A1 | 10/2019 | Haag et al. |
| 2021/0268475 | A1 | 9/2021 | Nam et al. |

FOREIGN PATENT DOCUMENTS

| | | | | |
|---|---|---|---|---|
| CN | 206472524 | U | | 9/2017 |
| CN | 206519221 | U | | 9/2017 |
| CN | 108311236 | A | * | 7/2018 ............ B02C 18/12 |
| CN | 108473614 | A | | 8/2018 |
| CN | 208066469 | U | | 11/2018 |
| CN | 208302929 | U | * | 1/2019 |
| CN | 110300650 | A | | 10/2019 |
| EP | 3040361 | A1 | | 7/2016 |
| EP | 3040362 | A1 | | 7/2016 |
| EP | 3939756 | A1 | | 1/2022 |
| EP | 4000736 | A1 | | 5/2022 |
| JP | S56-161408 | A | | 12/1981 |
| JP | S57-158209 | A | | 9/1982 |
| JP | S57-198714 | A | | 12/1982 |
| JP | 62-91251 | A | | 4/1987 |
| JP | S62-286559 | A | | 12/1987 |
| JP | S62-286560 | A | | 12/1987 |
| JP | S63-63258 | B2 | | 12/1988 |
| JP | 2000-063527 | A | | 2/2000 |
| JP | 2001-079829 | A | | 3/2001 |
| JP | 3415036 | B2 | | 6/2003 |
| JP | 2008-514396 | A | | 5/2008 |
| JP | 2010-505003 | A | | 2/2010 |
| JP | 2015-526577 | A | | 9/2015 |
| JP | 6170996 | B2 | | 7/2017 |
| KR | 10-2006-0128578 | A | | 12/2006 |
| KR | 10-2011-0105610 | A | | 9/2011 |
| KR | 10-2011-0137081 | A | | 12/2011 |
| KR | 10-2016-0048843 | A | | 5/2016 |
| KR | 10-2016-0078114 | A | | 7/2016 |
| KR | 10-2019-0076715 | A | | 7/2019 |
| WO | 2015-030130 | A1 | | 3/2015 |
| WO | WO-2015030129 | A1 | * | 3/2015 ............ A61F 13/15 |
| WO | 2016-052537 | A1 | | 4/2016 |
| WO | 2016/105119 | A1 | | 6/2016 |
| WO | 2020/149691 | A1 | | 7/2020 |

OTHER PUBLICATIONS

International Search Report (with partial translation) and Written Opinion issued in corresponding International Patent Application No. PCT/KR2020/016390 on Feb. 10, 2021.
Buchholz et al., Modern Superabsorbent Polymer Technology, Chapter 3, pp. 69-103, 1998.
Third Party Observation submitted in corresponding International Patent Application No. PCT/KR2020/016390 dated Mar. 1, 2022.
Extended European Search Report issued from the European Patent Office dated Jul. 21, 2022 in connection with the corresponding European Patent Application No. 20889315.6.
Office Action issued Nov. 6, 2023 for corresponding European Patent Application No. 20889315.6.

* cited by examiner

COMPLEX MINUTE CUTTING APPARATUS FOR SUPER ABSORBENT POLYMER HYDROGEL

CROSS-REFERENCE WITH RELATED APPLICATION(S)

This application claims priority to and the benefit of Korean Patent Application No. 10-2019-0150705, filed in the Korean Intellectual Property Office on Nov. 21, 2019, the entire contents of which are incorporated herein by reference.

TECHNICAL FIELD

The present invention relates to a complex minute cutting apparatus for a superabsorbent hydrogel, capable of performing smooth minute cutting of the hydrogel.

BACKGROUND ART

A superabsorbent polymer (SAP) is a synthetic polymer material with a function of being capable of absorbing moisture of 500 to 1000 times its own weight, and is referred to as a superabsorbency material (SAM), an absorbent gel material (AGM), or the like by each developer.

The above-described superabsorbent polymer has begun to be put into practical use as a sanitary product, and is currently widely used as a material such as a soil repair agent for gardening, a water supply material for civil works or construction, a sheet for seedlings, a freshness maintenance agent in the food distribution field, and a material for a poultice in addition to hygiene products such as paper diapers for children.

As a method of preparing the superabsorbent polymer as described above, a method by reverse-phase suspension polymerization or a method by aqueous solution polymerization is known. Regarding reverse-phase suspension polymerization, for example, Japanese Patent Publication No. 56-161408, Japanese Patent Publication No. 57-158209, and Japanese Patent Publication No. 57-198714 are disclosed. As a method by aqueous solution polymerization, again, a thermal polymerization method in which a hydrogel polymer is polymerized while breaking and cooling it in a kneader equipped with several axes, and a photopolymerization method in which a high concentration aqueous solution is irradiated with ultraviolet rays or the like on a belt to perform polymerization and drying at a same time, are known.

A hydrogel or hydrogel polymer obtained through the polymerization reaction as described above is generally pulverized after a drying process and then is commercially available as a powdery product. It is important to increase the surface area of the hydrogel polymer as much as possible in order to efficiently perform the drying step. Accordingly, a method of increasing a surface area of the hydrogel polymer to be dried by simply pulverizing the hydrogel polymer that is polymerized through thermal polymerization or photopolymerization may be considered in order to increase the surface area of the hydrogel polymer before the drying process as much as possible. A process of first pulverizing the hydrogel polymer after polymerization has been disclosed in order to increase the surface area of the hydrogel polymer as described above.

A chopper is mainly used in the first pulverizing the hydrogel polymer.

Such a chopper includes a screw for moving the hydrogel, a barrel including a spiral, a cutter blade for cutting the hydrogel, and a perforated plate from which the cut hydrogel is discharged.

Herein, the cutter blade and the perforated plate are each installed as a single unit, and thus it is difficult to cut it into a particle size of the hydrogel to be equal to or smaller than a predetermined size. In addition, even when the particle size is cut below a predetermined size by repeating the cutting process, the gel cut into a very small particle size may cause a kneading phenomenon by increasing a pressure in the chopper, resulting in an increase in an extractable content (EC) and a change in a physical property.

DISCLOSURE

Technical Problem

An embodiment of the present invention has been made in an effort to provide a complex minute cutting apparatus for a superabsorbent hydrogel, capable of performing a cutting process of the hydrogel into a small size that is equal to or smaller than a predetermined size and improving manufacturing quality.

Technical Solution

An embodiment of the present invention provides a complex minute cutting apparatus for a superabsorbent hydrogel, including: a barrel body in which a transfer space through which a hydrogel is transferred is formed and a discharge part is formed at a side surface thereof; a transfer unit installed in the barrel body to transfer the hydrogel in the transfer space; and a plurality of cutting modules installed in the transfer unit to pulverize the hydrogel and discharging it to an outside of the discharge unit in a cut state.

Each of cutting modules may include: a cutter member installed inside the barrel body to pulverize the hydrogel transferred by the transfer unit; and perforated plates configured to discharge the hydrogel pulverized by the cutter member in a cut state.

The transfer unit may include: a screw member rotatably installed in the transfer space to move the hydrogel; and a driving motor configured to provide a rotational driving force to the screw member.

The cutting modules may be installed in a state of being spaced apart from each other in a direction of the discharge part in the screw member.

A plurality of cutting holes for discharging the hydrogel in a cut state may be formed in the perforated plates, and the cutting holes may be formed in the perforated plates to have diameters of different sizes.

The cutting holes may be formed to have a minimum diameter at a position of the discharge part among the perforated plates.

Screw threads of the screw member may be formed to have a same pitch.

Advantageous Effects

According to an embodiment of the present invention, a smooth cutting process of a hydrogel and smooth cutting of the hydrogel into a small size of less than a predetermined size are possible by installing a perforated plate and a cutter member and forming a size of cutting holes formed in each of a plurality of perforated plates to gradually decrease in a direction of a discharge part.

MODE FOR INVENTION

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
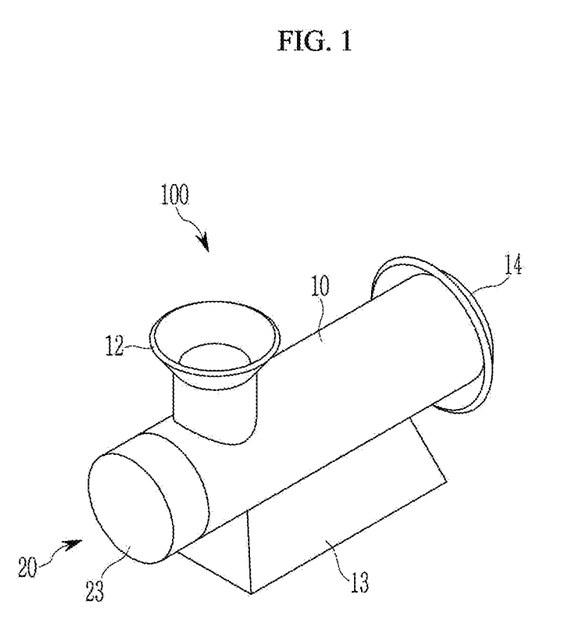
FIG. 1 illustrates a schematic perspective view of a complex minute cutting apparatus for a superabsorbent hydrogel according to a first embodiment of the present invention.
Figure 2:
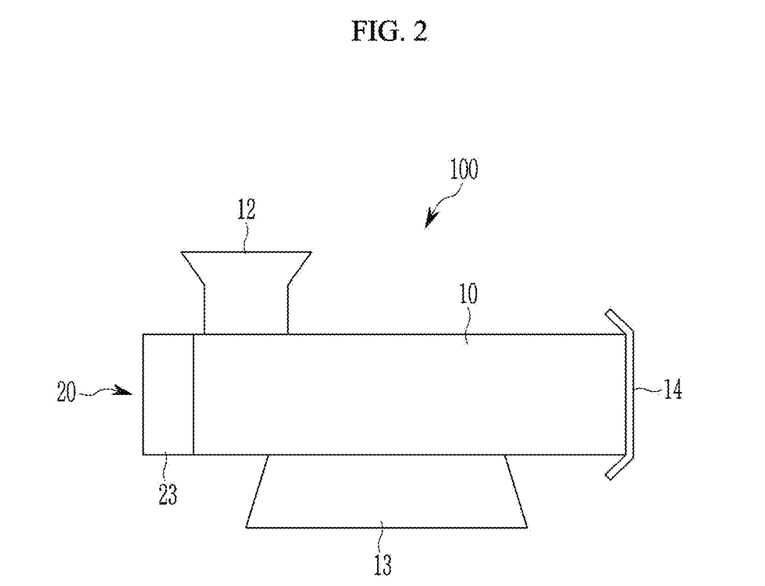
FIG. 2 illustrates a top plan view schematically showing the complex minute cutting apparatus of FIG. 1.
Figure 3:
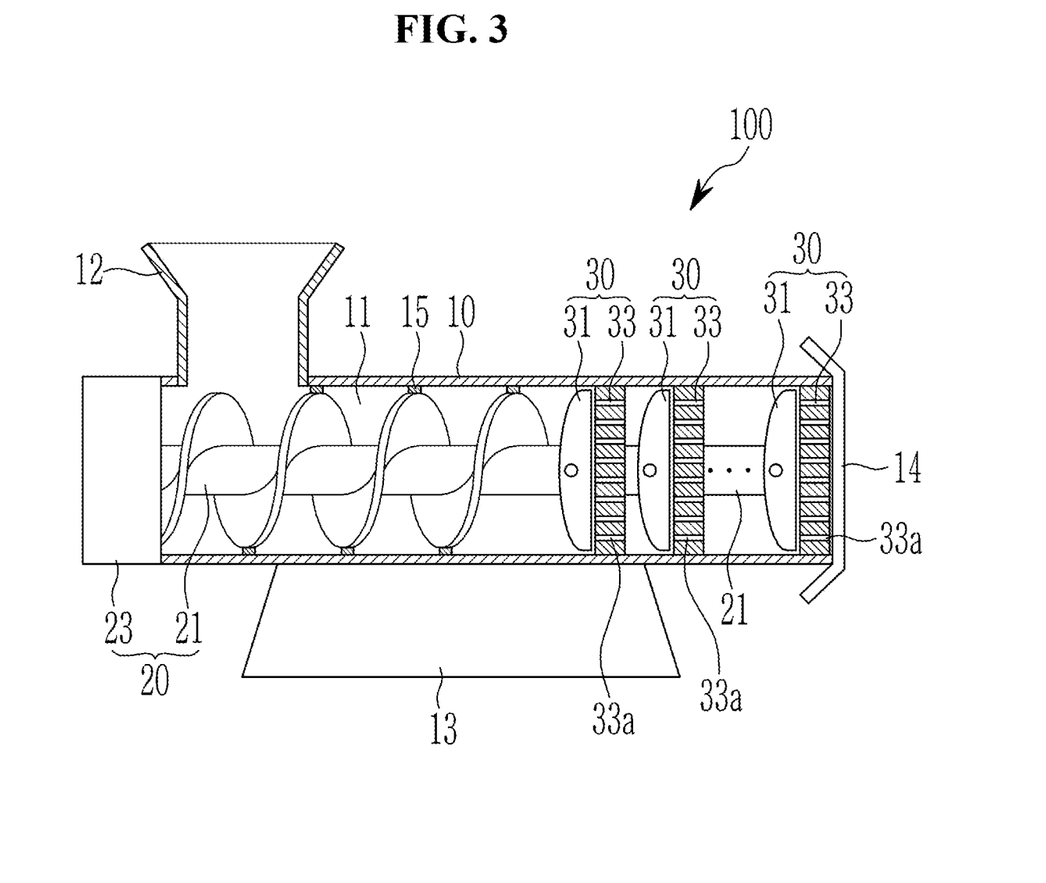
FIG. 3 illustrates a cross-sectional view of main parts schematically showing the complex minute cutting apparatus of FIG. 1.

FIG. 1 illustrates a schematic perspective view of a complex minute cutting apparatus for a superabsorbent hydrogel according to a first embodiment of the present invention, FIG. 2 illustrates a top plan view schematically showing the complex minute cutting apparatus of FIG. 1, and FIG. 3 illustrates a cross-sectional view of main parts schematically showing the complex minute cutting apparatus of FIG. 1.

As illustrated in FIG. 1 to FIG. 3, according to the first example of the present invention, the complex minute cutting apparatus for a superabsorbent hydrogel includes a barrel body 10 in which a transfer space 11 through which a hydrogel is transferred is formed, a transfer unit 20 installed in the barrel body 10 to transfer the hydrogel in the transfer space 11, and a plurality of cutting modules 30 installed in the transfer unit 20 to pulverize the hydrogel and discharge the pulverized hydrogel to the outside of the barrel body 10 in a cut state.

The barrel body 10 may be installed in a state in which the transfer space 11 through which the hydrogel is transferred is formed along a longitudinal direction and supported on a bottom surface thereof.

An injection part 12 for injecting the hydrogel into the transfer space 11 may be installed in an open state at an upper portion of the barrel body 10.

A support base 13 may protrude from a lower portion of the barrel body 10 for being stably supported on the bottom surface thereof.

A barrel spiral 15 may protrude inside the barrel body 10.

The barrel spiral 15 may be formed to protrude from an inner wall surface of the barrel body 10 in a spiral shape corresponding to a spiral shape of a screw member 21.

The barrel spiral 15 may be formed to protrude from the inner wall surface of the barrel body 10 in a plurality of spiral shapes in an opposite direction corresponding to the spiral shape of the screw member 21.

In the present embodiment, the barrel spiral 15 is exemplarily described to protrude from the inner wall surface of the barrel body 10, but the present invention is not limited thereto, and it may not be formed.

The barrel spiral 15 is not necessarily limited to the spiral shape, but may have a concentric band-shaped protrusion on the inner wall surface of the barrel body 10 or a sphere protruding corresponding to a helical position of the screw member 21, or it is also possible to apply various changes such as angular protrusion.

As such, since the barrel spiral 15 is formed to protrude inside the barrel body 10, the hydrogel may be stably transferred without backflow together with auxiliary action of the hydrogel.

The hydrogel may be transferred by a transfer operation of the transfer unit 20, which will be described later, in a state of being injected into the barrel body 10 through the injection part 12.

The injection part 12 is formed in an open state at an upper side of the barrel body 10, and is installed in a state expanded upward, so that the hydrogel may be easily introduced into the inside.

As such, the hydrogel may be appropriately pulverized by being transferred in a direction of a discharge part 14 of the barrel body 10 by a driving force of the transfer unit 20 in the state of being injected into the inside of the barrel body 10.

The transfer unit 20, which is installed in the barrel body 10, may be installed to provide a transfer driving force for transferring the hydrogel.

More specifically, the transfer unit 20 includes a screw member 21 that is rotatably installed in the transfer space 11 to move the hydrogel, and a driving motor 23 that provides a rotational driving force to the screw member 21.

The screw member 21, which is rotatably installed along the longitudinal direction of the transfer space 11 inside the barrel body 10, may be installed to transfer the hydrogel filled in the transfer space 11 by a driving operation of the driving motor 23 in a direction of the discharge part 14 of the barrel body 10.

The driving motor 23 may be installed in the barrel body 10, and a driving shaft may be installed at a first end of the screw member 21 to provide a rotational driving force by rotating the screw member 21 in one direction such that the hydrogel is transferred inside the barrel body 10 while maintaining an appropriate transferring speed.

The driving motor 23 and the screw member 21 may be installed to transfer the rotational driving force through a reducer (not illustrated).

Meanwhile, a cutting module 30 may be installed in the screw member 21 for discharging the hydrogel to the outside of the discharging part 14 in a cut state by pulverizing the hydrogel.

A plurality of cutting modules 30 may be installed along a longitudinal direction of the screw member 21.

A reason why the cutting modules 30 are installed in the screw member 21 is to maintain a size of cut particles of the hydrogel at an appropriate level to enable smooth cutting.

More specifically, each cutting module 30 may include a cutter member 31 installed inside the barrel body 10 to pulverize the hydrogel transferred by the transfer unit 20, and a perforated plate 33 for discharging the hydrogel pulverized by the cutter member 31 in a cut state. The cutting modules 30 may be installed to be spaced apart from each other along the longitudinal direction of the screw member 21.

The cutter member 31 may be rotatably installed together with the rotational operation of the screw member 21 to appropriately pulverize the hydrogel transferred from the transfer space 11 by the screw member 21.

Since the cutting modules 30 are installed, a plurality of cutter members 31 may be installed in the screw member 21 with the perforated plate 33 interposed therebetween.

The perforated plate 33 may be installed between the cutter members 31 and at a portion of the discharge part 14 of the barrel body 10, respectively. A plurality of cutting holes may be formed in the perforated plate 33.

Accordingly, the hydrogel pulverized by the cutter member 31 may be pressed and moved inside the barrel body 10 by a pressing force generated by a rotational operation of the screw member 21, thereby being stably discharged in the cut state through the cutting holes of the perforated plate 33.

Herein, a surfactant may be injected into the barrel body 10. The surfactant may allow a smoother cutting action in the process of pulverizing the hydrogel in the perforated plate 33 and cutting it through the cutting holes of the perforated plate 33.

The perforated plate 33 may be formed of a heat-treated metal material to stably support a pressing force of the transferred hydrogel.

Figure 4:
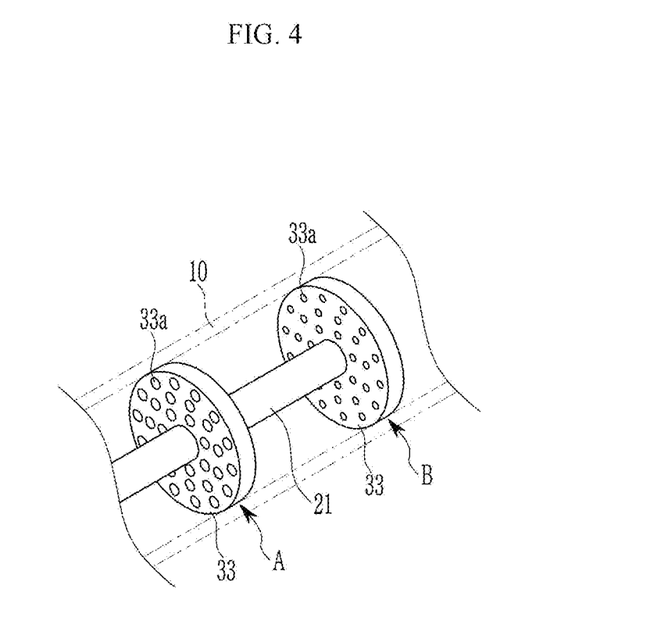
FIG. 4 illustrates main parts schematically showing a state in which a plurality of perforated plates are installed in a barrel body according to the first embodiment of the present invention.

FIG. 4 illustrates main parts schematically showing a state in which a plurality of perforated plates are installed in a barrel body according to the first embodiment of the present invention.

As illustrated in FIG. 4, the cutting holes 33a formed in the perforated plate 33 may be formed in each of the plurality of perforated plates 33 to have different diameters. FIG. 4 illustrates main parts schematically showing only the perforated plate 33 installed inside the barrel body 10.

That is, a plurality of perforated plates 33 are disposed in a state of being spaced apart from each other at a predetermined interval along the longitudinal direction of the screw member 21, and cutting holes 33a may be formed in a state in which a diameter of each of the plurality of perforated plates 33 is gradually decreased in the direction of the discharge part 14.

As such, among the plurality of perforated plates 33, the cutting holes 33a may be formed to have a maximum diameter in the perforated plate 33 at a position A closest to the driving motor 23 from the inside of the barrel body 10, and may be formed to have a minimum diameter at the perforated plate 33 at a position B closest to the discharge part 14.

As described above, in the complex minute cutting apparatus 100 for a superabsorbent hydrogel, the perforated plates 33 and the cutter members 31 are installed along the longitudinal direction of the screw member 21, and the size of the cutting holes 33a formed in each of the perforated plates 33 is gradually reduced in the direction of the discharge unit 14, so that the cutting process of the hydrogel may be more smoothly performed and the hydrogel may be cut to have a small size of several millimeters or less.

Example 1

According to Example 1, a monomer composition having a total solid content of 45.0 wt % was prepared by mixing 100 g of acrylic acid (acrylic acid), 123.5 g of 32% caustic soda (NaOH), 0.2 g of sodium persulfate as a thermal polymerization initiator, 0.008 g of phenyl (2,4,6 trimethylbenzoyl) phosphine oxide as a photoinitiator, 0.26 g of polyethylene glycol diacrylate (PEGDA), and 40 g of water.

Herein, a polymerization reaction was carried out for 60 s by supplying a monomer composition to an ultraviolet irradiation device, and at the same time, by irradiating ultraviolet rays having an intensity of 10 mW/cm$^2$. A final hydrogel sample was obtained by applying 0.3 g of a hydrophobic surfactant (SPAN 60) to a polymerization sheet manufactured after the polymerization reaction was performed, and then performing cutting by using a chopper with equally spaced screws, and drying it by using a rotary dryer with a speed of 300 RPM.

Comparative Example 1

TABLE 1

| | 4 mm hole plate (perforated plate) | | | | | | | | |
|---|---|---|---|---|---|---|---|---|---|
| Mesh Period | Particle size | 1 time | 2 times | 3 times | 5 times | 7 times | 9 times | 11 times | 13 times |
| # 10 more | 3000 | 55 | 23 | 5 | 2 | 0 | 0 | 0 | 1 |
| # 10-14 | 1700 | 24 | 28 | 22 | 13 | 5 | 3 | 3 | 3 |
| # 14-20 | 1125 | 15 | 26 | 39 | 38 | 29 | 26 | 24 | 21 |
| # 20-30 | 725 | 4 | 11 | 19 | 24 | 26 | 28 | 28 | 25 |
| # 30-50 | 450 | 2 | 10 | 14 | 22 | 34 | 38 | 41 | 43 |
| # 50-100 | 225 | 0 | 2 | 1 | 2 | 5 | 4 | 4 | 6 |
| # 100 less | 75 | 0 | 0 | 0 | 0 | 1 | 1 | 0 | 0 |
| Average particle size (μm) | | 2272 | 1590 | 1162 | 962 | 783 | 730 | 718 | 710 |
| Particle size reduction rate | | 100% | 70% | 51% | 42% | 34% | 32% | 32% | 31% |

As shown in Table 1, it can be seen that the average particle size decreases when the hydrogel is passed through the perforated plate 13 times, and the average particle size decreases during cutting of the hydrogel when the hydrogel of Example 1 is passed through a plurality of perforated plates through Comparative Example 1.

Example 2 and Comparative Example 2

As shown in Table 2, it can be seen that a type of the hydrophobic surfactant of Example 1 was changed to SA (stearic acid series), and in the comparative example, the temperature of the cutting process was changed to 40° C., and it is impossible to manufacture and measure it due to severe kneading at 40° C.

TABLE 2

|  | Example 2 | Comparative Example 2 |
|---|---|---|
| Hole plate size | 6 | 6 |
| Additive used | SA | SA |
| Additive amount used (ppm) | 3000 | 3000 |
| Polymerization sheet temperature (° C.) | 80 | 40 |
| CRC | 30.4 | Cannot be manufactured and measured due to severe kneading |
| EC | 5.5 | |
| BPI | 23.0 | |

In Table 2, CRC denotes centrifugal retention capacity, and EC denotes an extractable content.

Figure 5:
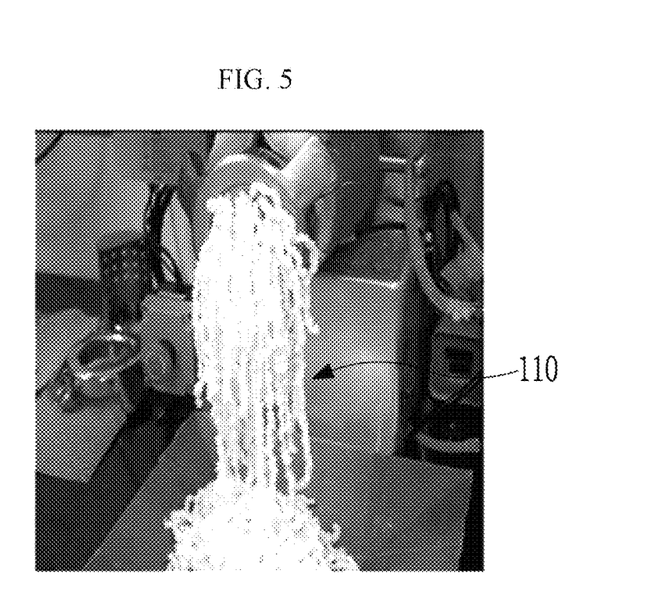
FIG. 5 schematically illustrates a cutting state of a conventional hydrogel at a temperature of 40° C.
Figure 6:
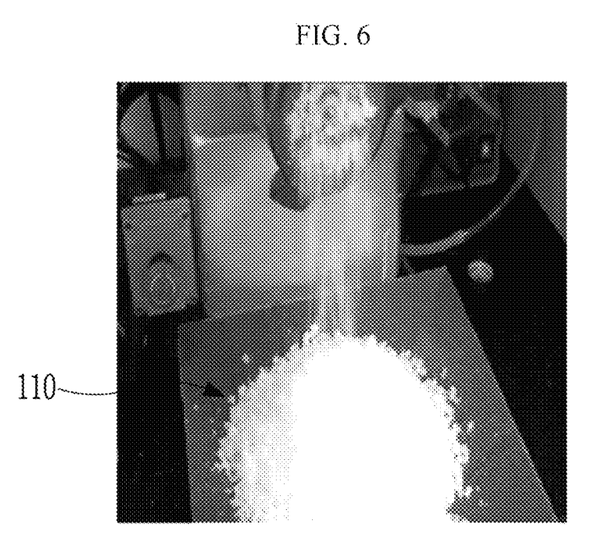
FIG. 6 schematically illustrates a cutting state of a hydrogel at a temperature of 80° C. according to a first embodiment of the present invention.

FIG. 5 illustrates a poor state of a cut state of a hydrogel 110 when the temperature of the polymerization sheet is 40° C., and FIG. 6 illustrates a state in which kneading does not occur in the hydrogel 110 when the temperature of the polymerization sheet is 80° C.

Figure 7:
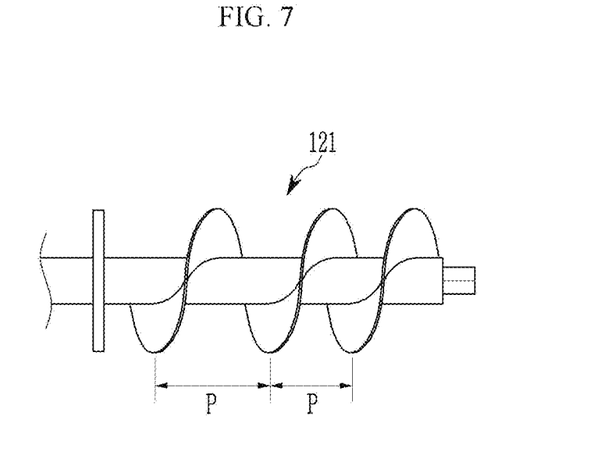
FIG. 7 illustrates main parts schematically showing a state in which pitches of a screw member are formed at an equal interval according to a third embodiment of the present invention.

FIG. 7 illustrates main parts schematically showing a state in which pitches of a screw member are formed at an equal interval according to a third embodiment of the present invention. Detailed descriptions of the same reference numerals as those of FIG. 1 to FIG. 6 are omitted.

As illustrated in FIG. 7, a pitch P of the screw member 121 according to the third embodiment of the present invention may be formed to protrude at equal pitches at an equal interval. Accordingly, the cut particles of the hydrogel may be cut in a good state without kneading.

Table 3 shows a process of cutting the hydrogel using the screw member having equal pitches at an equal interval with a general screw according to the third embodiment.

TABLE 3

|  | Existing general screw member | Screw member with equal pitches |
|---|---|---|
| Hole plate size (mm) | 6 | 6 |
| Additive used | Span 60 | Span 60 |
| Additive amount used (ppm) | 3000 | 3000 |
| CRC | 31.5 | 30.1 |
| EC | 6.3 | 4.1 |
| BPI | 21.8 | 27.5 |

Figure 8:
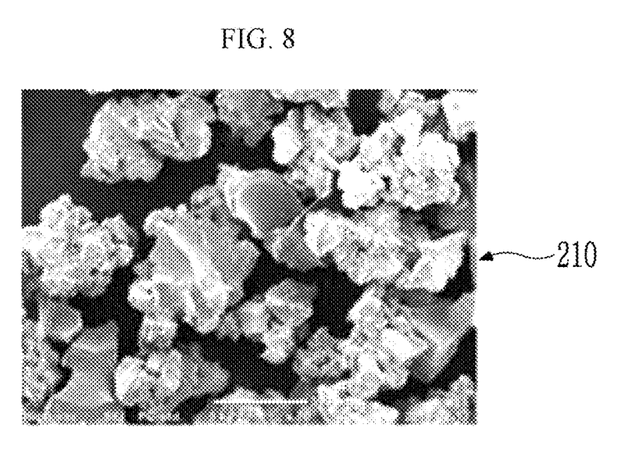
FIG. 8 illustrates an enlarged view of main parts schematically showing particles of a hydrogel that is cut by using a conventional screw member.
Figure 9:
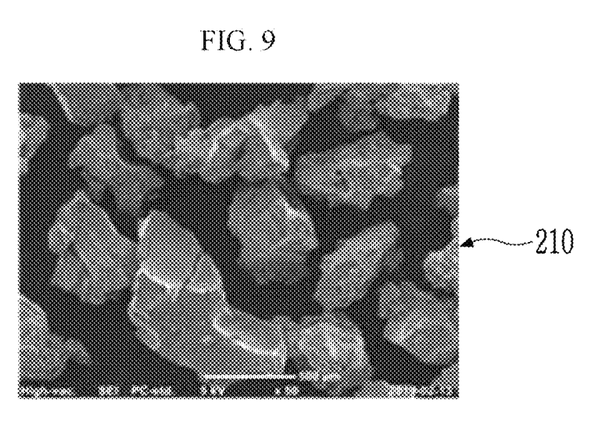
FIG. 9 illustrates an enlarged view of main parts showing minutely set particles of a hydrogel using a screw member having equally spaced pitches according to a fourth embodiment of the present invention.

FIG. 8 illustrates an enlarged view of main parts showing particles of a hydrogel that is cut by using a conventional screw member, and FIG. 9 illustrates an enlarged view of main parts showing minutely set particles of a hydrogel using a screw member having equally spaced pitches according to a fourth embodiment of the present invention.

As illustrated in FIG. 8, it can be seen that kneading occurs in a hydrogel 210 in the conventional screw member, while as illustrated in FIG. 9, kneading does not occur in the hydrogel 210 in the fourth embodiment of the present invention. In addition, as shown in Table 3, an effect of reducing EC may be confirmed.

That is, as illustrated in FIG. 9, in the case of using screw members with equally spaced pitches, pressure drop occurs, so kneading of hydrogel particles does not occur, and an effect of reducing extractable content (EC) is also possible.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Symbols | |
|---|---|
| 10 | barrel body |
| 11 | transfer space |
| 12 | injection part |
| 13 | support base |
| 14 | discharge part |
| 15 | barrel spiral |
| 20 | transfer unit |
| 21, 121 | screw member |
| 23 | driving motor |
| 30 | cutting module |
| 31 | cutter member |
| 33 | perforated plate |
| 33a | cutting hole |
| 110, 210 | hydrogel |

The invention claimed is:

1. A complex minute cutting apparatus for a superabsorbent hydrogel, comprising:
  a barrel body comprising:
    a transfer space through which a hydrogel is transferred; and
    a discharge part at a side surface of the barrel body;
  a transfer unit located in the transfer space of the barrel body to transfer the hydrogel in the transfer space, wherein the transfer unit includes a screw member rotatably installed in the transfer space to move the hydrogel; and
  a plurality of cutting modules attached to the screw member of the transfer unit in a longitudinal direction to pulverize and discharge the hydrogel through a discharge part in a particle form,
  wherein each of the cutting modules includes: a cutter member to pulverize the hydrogel transferred by the transfer unit; and perforated plates to discharge the hydrogel pulverized by the cutter member in a cut state,
  wherein
  the perforated plate includes a plurality of cutting holes discharging the hydrogel in a particle form,
  the hydrogel cuts through the cutting holes to form the particles having a size of the cutting holes.

2. The complex minute cutting apparatus of claim 1, wherein
  the transfer unit further includes:
  a driving motor configured to provide a rotational driving force to the screw member.

3. The complex minute cutting apparatus of claim 2, wherein
  the plurality of cutting modules are arranged spaced apart from each other towards the discharge part.

4. The complex minute cutting apparatus of claim 3, wherein
  the cutting holes are formed in the perforated plates to have diameters of different sizes.

5. The complex minute cutting apparatus of claim 4, wherein
the perforated plate located at a closest position to the discharge part has the cutting holes having a smallest diameter.

6. The complex minute cutting apparatus of claim 2, wherein
the screw member comprises a plurality of screw threads having a same pitch.

7. The complex minute cutting apparatus of claim 4, wherein diameters of the cutting holes gradually decreases in a direction of the discharge part.

\* \* \* \* \*